A. O. QUINBY.
GATE.
APPLICATION FILED JAN. 26, 1911.
1,060,857.
Patented May 6, 1913.
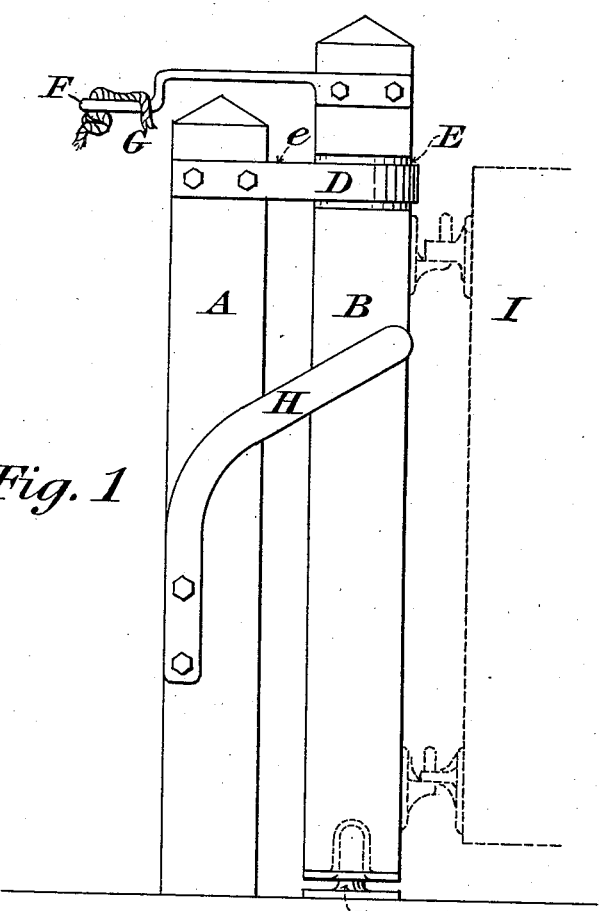
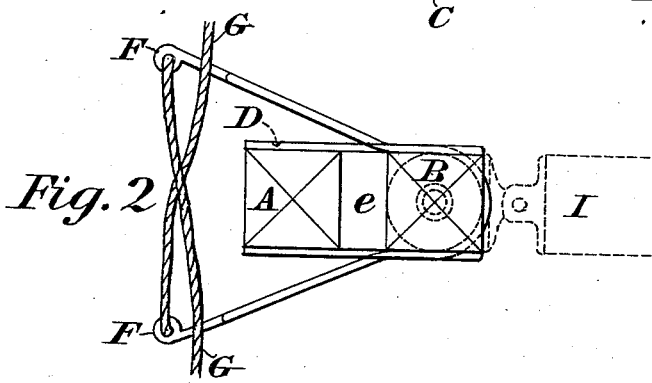
WITNESSES:
G. D. Hutchison
V. H. Fontaine
INVENTOR
Albert Orlando Quinby
BY
J. N. Sprouse
ATTORNEY
COLUMBIA PLANOGRAPH CO., WASHINGTON, D. C.

UNITED STATES PATENT OFFICE.

ALBERT ORLANDO QUINBY, OF FRESNO, CALIFORNIA.

GATE.

1,060,857. Specification of Letters Patent. Patented May 6, 1913.

Application filed January 26, 1911. Serial No. 604,753.

*To all whom it may concern:*

Be it known that I, ALBERT ORLANDO QUINBY, a citizen of the United States, residing at 1624 E street, in the city of Fresno, county of Fresno, State of California, have invented a new and useful Gate.

This invention relates to gates and has for its object to provide a gate which can be unlatched by a traveler without the necessity of dismounting or alighting from a conveyance in order to operate the gate latch. This and other objects of the invention, together with means whereby the same may be carried into effect, will best be understood from the following description of one form or embodiment thereof illustrated in the accompanying drawings, it being understood, however, that the invention is not limited to the construction shown, but may be embodied in other forms without departing from the spirit and scope thereof.

In said drawings, Figure 1 is a side elevation of a gate post or mounting constructed in accordance with the invention, and Fig. 2 is a plan view thereof.

A denotes a stationary gate post of any ordinary form and B a revolving or rotatable post located adjacent the post A. The post B is mounted at its lower end to turn upon a pin C supported in any suitable manner upon the ground, and at its upper end is formed with a cylindrical neck E which turns in a strap D supported by the post A. In order to hold the post B in its proper upright position and to space the same from the post A there is provided within the strap D, a filler *e*.

I denotes a gate which is hinged to the post B, as clearly shown in Fig. 1. The pair of hinges upon which the gate I is hung, being fixed to the post B, limit the swinging movement of said gate on said post to movement about an axis substantially parallel to the axis of rotation of the post. For turning the post B the same is preferably provided with a pair of rigidly attached arms F extending outwardly from said post in opposite directions, and at an angle thereto, as shown in Fig. 2. Attached to the arms F are crossed ropes or cords G by which the post B may be turned.

The post B is preferably made square or formed with squared or flattened portions which are engaged by spring plates H carried by the post A, and by means of which the post B is yieldingly held in positions to maintain the gate either latched or unlatched, as will more fully appear.

In operation, a traveler approaching in either direction will pull upon the nearest rope G, thereby causing the post B to rotate upon its axis. This rotation is permitted by the hinges upon which the gate I is hung, it being understood that the gate at this time is secured at its opposite edge by its latch (not shown). The post B in its rotation, however, carries with it the gate hinges, thereby causing a bodily movement of the gate which will withdraw the gate latch from its striker. After the disengagement of the latch the friction of the gate hinges will naturally cause the gate to swing open in the direction of rotation of the post B, or, if necessary, this swinging movement can be assisted by a push upon the gate. It will be obvious that, with the post B held in the position shown by the springs H, the gate latch cannot become disengaged except by direct operation thereof. On the other hand if the post B be turned through one-quarter of a rotation and held in such position by the springs H the gate I cannot be closed into such position as will permit the locking engagement of the latch, so that the gate is maintained in a permanently unlatched condition.

Having thus described my invention I claim:

1. The combination with a gate post mounted to rotate in a fixed axis, of a gate, and means connecting said gate and gate post constructed and arranged to permit said gate to swing on said post about an axis substantially parallel to and closely adjacent the axis of rotation of said post.

2. The combination with a fixed gate post, of a post mounted to rotate on a fixed axis adjacent said fixed post, a gate disconnected from said fixed post, means connecting said gate and rotatably mounted post constructed and arranged to permit said gate to swing on said post about an axis substantially parallel to the axis of rotation of said post and to prevent swinging of said gate about any other axis, and means for rotating said last named post to release and open said gate.

ALBERT ORLANDO QUINBY.

Witnesses:
G. D. HUTCHISON,
V. H. FONTAINE.

Copies of this patent may be obtained for five cents each, by addressing the "Commissioner of Patents, Washington, D. C."